United States Patent [19]

Leibfried, Sr.

[11] Patent Number: 5,077,134

[45] Date of Patent: * Dec. 31, 1991

[54] ORGANOSILICON COMPOSITIONS

[75] Inventor: Raymond T. Leibfried, Sr., Wilmington, Del.

[73] Assignee: Hercules Incorporated, Wilmington, Del.

[*] Notice: The portion of the term of this patent subsequent to Dec. 31, 2008 has been disclaimed.

[21] Appl. No.: 419,430

[22] Filed: Oct. 10, 1989

[51] Int. Cl.$^5$ ............................................. B32B 9/04
[52] U.S. Cl. ................................... 428/447; 528/15; 528/25; 528/105
[58] Field of Search ..................... 528/15, 25, 105; 428/447

[56] References Cited

U.S. PATENT DOCUMENTS

| | | | |
|---|---|---|---|
| 2,624,721 | 1/1953 | Hatcher | 260/46.5 |
| 2,665,287 | 1/1954 | Hatcher | 260/448.2 |
| 2,823,218 | 2/1958 | Speier | 260/448.2 |
| 3,197,432 | 7/1965 | Lamoreaux | 260/46.5 |
| 3,197,433 | 7/1965 | Lamoreaux | 260/46.5 |
| 3,198,766 | 8/1965 | Nitzsche et al. | 260/46.5 |
| 3,220,972 | 11/1965 | Lamoreaux | 260/46.5 |
| 3,271,362 | 9/1966 | Chalk et al. | 260/46.5 |
| 3,929,850 | 12/1975 | Streck et al. | 260/448.2 E |
| 3,992,427 | 11/1976 | Chandra | 260/448.2 E |
| 4,011,247 | 3/1977 | Sato et al. | 260/348 SC |
| 4,599,440 | 7/1986 | Watanabe | 556/460 |
| 4,639,501 | 1/1987 | Seyferth et al. | 528/15 |
| 4,719,273 | 1/1988 | Seyferth et al. | 528/15 |
| 4,877,820 | 10/1989 | Cowan | 523/222 |
| 4,900,779 | 2/1990 | Leibfried | 524/862 |
| 4,902,731 | 2/1990 | Leibfried | 523/222 |

FOREIGN PATENT DOCUMENTS

| | | |
|---|---|---|
| 0204171 | 12/1986 | European Pat. Off. . |
| 2595363 | 9/1987 | France . |
| 2595364 | 9/1987 | France . |
| 767112 | 9/1980 | U.S.S.R. . |
| 1439945 | 6/1976 | United Kingdom . |

OTHER PUBLICATIONS

Risse et al., "Di- and Tetrafunctional Initiators for the Living Ring-Opening Olefin Metathesis Polymerization of Strained Cyclic Olefins" (1989).

Nogaideli et al., "Hydroxylation of Dicyclopentadiene With Organochlorosilanes and Siloxanes", Soobschh. Akad. Nauk Gruz. SSR. 82. No. 3 589 (1976).

Kim et al., "Polycycloalkylene-Siloxan Polymers: Synthesis and Thermal Study", 16 *Journal of Polymer Science: Polymer Chemistry* Edition, 483-490 (1978).

Primary Examiner—Melvyn I. Marquis
Assistant Examiner—Karen A. Hellender
Attorney, Agent, or Firm—Mark D. Kuller

[57] ABSTRACT

A crosslinked organosilicon polymer or crosslinkable organosilicon prepolymer comprising alternating (a) polycyclic polyene residues and (b) polysiloxane/siloxysilane residues linked through carbon to silicon bonds, wherein the polycyclic polyene residues are derived from polycyclic polyenes having at least two non-aromatic carbon-carbon double bonds in their rings and the polysiloxane/siloxysilane residues are derived from (i) cyclic polysiloxanes or tetrahedral siloxysilanes and (ii) linear, ≡SiH terminated polysiloxanes.

19 Claims, No Drawings

ORGANOSILICON COMPOSITIONS

This invention relates to new and novel organosilicon polymers and prepolymers.

BACKGROUND OF THE INVENTION

A new class of high molecular weight organosilicon polymers and prepolymers which have excellent physical, thermal and electrical properties and outstanding resistance to water, and that can be used to prepare shaped articles is described by the instant inventor in U.S. patent application Ser. Nos. 07/079,740 (now U.S. Pat. No. 4,900,779) and 07/232,826 (now U.S. Pat. No. 4,902,731). They are thermoset or thermoplastic organosilicon polymers comprising alternating polycyclic hydrocarbon residues and cyclic polysiloxanes or tetrahedral siloxysilane residues linked through carbon to silicon bonds. This application is directed to novel organosilicon polymers and prepolymers, such as those described in U.S. patent application Ser. Nos. 07/079,740 now U.S. Pat. No. 4,900,779 and 07/232,826 now U.S. Pat. No. 4,902,731, further comprising linear, short chain ≡SiH terminated polysiloxanes.

SUMMARY OF THE INVENTION

A crosslinked organosilicon polymer or crosslinkable organosilicon prepolymer comprising alternating (a) polycyclic polyene residues and (b) polysiloxane/siloxysilane residues linked through carbon to silicon bonds, wherein the polycyclic polyene residues are derived from polycyclic polyenes having at least two non-aromatic carbon-carbon double bonds in their rings and the polysiloxane/siloxysilane residues are derived from (i) cyclic polysiloxanes or tetrehedral siloxysilanes and (ii) linear, short chain ≡SiH terminated polysiloxanes.

DETAILED DESCRIPTION OF THE INVENTION

Preferred linear, short chain ≡SiH terminated polysiloxanes have the general formula:

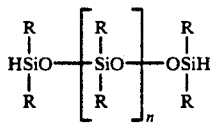

(I)

wherein n is 0 to 1000 and R is alkyl or aryl, preferably methyl or phenyl.

Polycyclic polyenes which can be employed are polycyclic hydrocarbon compounds having at least two non-aromatic carbon-carbon double bonds in their rings. Illustrative are compounds selected from the group consisting of cyclopentadiene oligomers (e.g., dicyclopentadiene, tricyclopentadiene and tetracyclopentadiene), bicycloheptadiene and its diels-alder oligomers with cyclopentadiene (e.g., dimethanohexahydronaphthalene), and substituted derivatives of any of these, e.g., methyl dicyclopentadiene. Preferred are bicycloheptadiene, dimethanohexahydronaphthalene, dicyclopentadiene and tricyclopentadiene, with the most preferred being bicycloheptadiene. Two or more polycyclic polyenes can be used in combination.

Any cyclic polysiloxane or tetrahedral siloxysilane with two or more hydrogen atoms bound to silicon will enter into the reaction. Cyclic polysiloxanes useful in forming the products of this invention have the general formula:

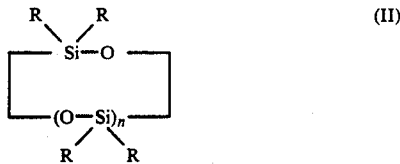

wherein R is hydrogen or a substituted or unsubstituted alkyl, alkoxy, aromatic or aryloxy radical, n is an integer from 3 to about 20, and R is hydrogen on at least two of the silicon atoms in the molecule.

Examples of reactants of Formula (II) include, e.g., tetramethylcyclotetrasiloxane, pentamethylcyclopentasiloxane, hexamethylcyclohexasiloxane, tetraethylcyclotetrasiloxane, cyclotetrasiloxane, tetraphenylcyclotetrasiloxane, tetraoctylcyclotetrasiloxane and hexamethylcyclotetrasiloxane.

The most commonly occurring members of this group are tetramethylcyclotetrasiloxane, pentamethylcyclopentasiloxane, and tetra-, penta- and hexamethylcyclohexasiloxanes, with tetramethyltetracyclosiloxane being a preferred member. In most cases, however, the material is a mixture of a number of species wherein n can vary widely. Generally, commercial mixtures contain up to about 20% (in purer forms as low as 2%) low molecular weight linear siloxanes, such as heptamethyltrisiloxane, octamethyltetrasiloxane, hexamethyl disiloxane, etc.

The tetrahedral siloxysilanes are represented by the general structural formula:

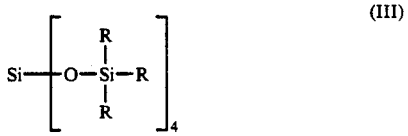

wherein R is as defined above and is hydrogen on at least two of the silicon atoms in the molecule.

Examples of reactants of Formula (III) include, e.g., tetrakisdimethylsiloxysilane, tetrakisdiphenylsiloxysilane, and tetrakisdiethylsiloxysilane. The tetrakisdimethylsiloxysilane is the best known and preferred species in this group.

The reactions for forming the organosilicon prepolymers and crosslinked polymers can be promoted thermally or by the addition of a hydrosilation catalyst or radical generators such as peroxides and azo compounds. Hydrosilation catalysts include metal salts and complexes of Group VIII elements. The preferred hydrosilation catalysts contain platinum.

The reactions for forming the organosilicon prepolymer compositions and crosslinked polymer proceed readily in the presence of a platinum-containing catalyst. The preferred catalyst, in terms of both reactivity and cost, is chloroplatinic acid ($H_2PtCl_6 \cdot 6H_2O$). Catalyst concentrations of 0.0005 to about 0.05% by weight, based on weight of the reactants, will effect smooth and substantially complete polymerization. Other platinum compounds can also be used to advantage in some instances, such as $PtCl_2$ and dibenzonitrile platinum dichloride. Platinum on carbon is also effective for carrying out high temperature polymerizations. Other useful platinum catalysts are disclosed in, e.g., U.S. Pat. Nos.

3,220,972, 3,715,334 and 3,159,662. An exhaustive discussion of the catalysis of hydrosilation can be found in Advances in Organometallic Chemistry, Vol. 17, beginning on page 407.

It is possible, by selection of reactants, reactant concentrations and reaction conditions, to prepare prepolymers and polymers exhibiting a broad range of properties and physical forms. Thus, it has been found possible to prepare prepolymer liquids, elastomeric materials and hard, glassy polymers.

According to one embodiment, crosslinked polymers per this invention are prepared by mixing the reactants and the hydrosilation catalyst and bringing the mixture to a temperature at which the reaction is initiated and proper temperature conditions are thereafter maintained to drive the reaction to substantial completion.

According to a second embodiment for preparing crosslinked polymers per this invention, prepolymers are formed by partially reacting the components, until about 30 to about 70% of the SiH groups have reacted. Such prepolymers are generally in the form of a flowable liquid, which is stable at room temperature. Crosslinked polymers are formed by further reacting the prepolymers in the presence of a hydrosilation catalyst.

In the prepolymers of the second embodiment and the crosslinked polymers, the total ratio of carbon-carbon double bonds in the rings of the polycyclic polyenes used to form the polycyclic polyene residues (a) to ≡SiH groups in the polysiloxanes and siloxysilanes used to form the polysiloxane/siloxysilane residues (b) is in the range of 0.4:1 to 1.7:1, preferably 0.8:1 to 1.3:1. The linear, short chain ≡SiH terminated polysiloxanes are generally used in an amount up to 70%, preferably 10 to 50%, by weight of the total polysiloxane and siloxysilane monomers used to form the polymer or prepolymer. The short chain, linear ≡SiH terminated polysiloxanes impart flexibility to the cured polymers and can be used to prepare flexible, tough thermosets and elastomers.

According to a preferred method for preparing crosslinked polymers per this invention, prepolymers are formed from polycyclic polyenes and cyclic polysiloxanes or tetrahedral siloxysilanes. Then, linear, short chain ≡SiH terminated polysiloxanes and, optionally, additional amounts of cyclic polysiloxanes or tetrahedral siloxysilanes are mixed with the prepolymer and the mixture is cured in the presence of a hydrosilation catalyst. In this embodiment, the linear, short chain ≡SiH terminated polysiloxanes are preferably used in an amount 10 to 50%, by weight of the polysiloxanes and siloxysilanes added to the preformed olefin reaction product. These polysiloxanes impart flexibility to the cured polymers and can be used to produce elastomers.

According to the preferred process, organosilicon prepolymers are made with a large excess of carbon-carbon double bonds available for reaction with ≡SiH groups. That is, the ratio of carbon-carbon double bonds in the rings of the polycyclic polyenes used to form the polycyclic polyene residues (a) to ≡SiH groups in the polysiloxanes and siloxysilanes used to form the polysiloxane/siloxysilane residues (b) (i) is greater than 1.8:1, preferably greater than 1.8:1 and up to 5:1, and most preferably greater than 1.8:1 and up to 2.2:1.

The organosilicon prepolymers of this embodiment may be prepared by mixing the reactants and the platinum catalyst and bringing the mixture to a temperature at which the reaction is initiated and proper temperature conditions are thereafter maintained to drive the reaction to substantial completion (typically, due to the large ratio of double bonds to ≡SiH groups available for reaction, greater than 90% of the ≡SiH groups are consumed).

The prepolymers of this embodiment are generally in the form of flowable liquids, which are stable at room temperature. The most stable prepolymers are formed at a double bond to ≡SiH ratio of about 2:1 since virtually all polyene is reacted and excess polycyclic polyene need not be removed. (Due to their odor, the presence of unreacted polycyclic polyenes is undesirable. Unreacted polycyclic polyenes can be stripped, e.g., using a rotoevaporator, to form odorless compositions.)

The basic reaction is fast. However, it is exothermic, and without using heat removal equipment (cooling coils or reflux condenser) the formation of the prepolymer is generally carried out for up to twenty-four hours or longer, depending on the reaction mass. In a continuous process with adequate heat removal, the earliest stages of the reaction can be carried out quickly. When 90% or more of the ≡SiH groups are reacted the prepolymers of the preferred embodiment are stable indefinitely at room temperature.

The crosslinked polymers are formed according to this embodiment by mixing the prepolymers with the linear, short chain ≡SiH terminated polysiloxanes and, optionally, additional cyclic polysiloxanes or additional tetrahedral siloxysilanes such that the total ratio of non-aromatic, non-conjugated carbon-carbon double bonds in the rings of the polycyclic polyenes used to form the polycyclic polyene residues (a) to ≡SiH groups in the polysiloxanes and siloxysilanes used to form the polysiloxane/siloxysilane residues (b) (i) and (ii) is in the ratio of 0.4:1 to 1.7:1; preferably 0.8:1 to 1.3:1, most preferably about 1:1, to form a low viscosity solution, and curing the mixture in the presence of a hydrosilation catalyst.

Preferably, according to this embodiment, the organosilicon prepolymers are reacted with the polysiloxanes and/or tetrahedral siloxysilanes to form a crosslinked polymer in a mold. The prepolymers and polysiloxanes/siloxysilanes are stored separately and are blended in an in-line mixer directly before entering the mold. The hydrosilation catalyst may be present in either or both stream(s) or injected directly into the mixer. The reaction is exothermic and proceeds rapidly so that the polymer gels and the product can be removed from the mold in minutes. The components of the blends are completely stable until they are mixed. This permits indefinite ambient storage of the materials. If the reaction upon mixing is too fast and viscosity increases rapidly preventing proper mold filling, a cure rate retardant (e.g. tetramethylethylenediamine) can be added.

Alternately, the blend components can be premixed and stirred in a tank. These blends have low viscosity and are pumpable. Addition of catalyst and/or application of heat can be used to cure the prepolymer composition. The reaction may be carried out in an extruder, mold or oven, or the blend may be applied directly on a substrate or part. For the more reactive compositions, mild complexing agents, such as tetramethylethylenediamine, can be added to control the room temperature reaction. The complex disassociates at temperatures greater than 100° C. to let curing proceed. With stronger complexing agents, such as phosphorus compounds, curing temperatures above 150° C. are required.

In a fourth embodiment, the reaction is carried out in the same manner as the preferred embodiment, except the linear, short chain ≡SiH terminated polysiloxanes are used in forming the prepolymers instead of some of the cyclic polysiloxanes or tetrahydral siloxysilanes. Optionally, cyclic polysiloxanes or tetrahedral siloxysilanes may completely replace the linear, short chain ≡SiH terminated polysiloxanes when forming a polymer from such a prepolymer.

Although a hydrosilation reaction via the carbon-carbon unsaturation of the polycyclic polyene rings and the ≡SiH group is the primary polymerization and crosslinking mechanism in all of the methods described, other types of polymerization and crosslinking may also take place as the curing temperature is increased. These may include, e.g., oxidative crosslinking, free radical polymerization (olefin addition reactions) and condensation of ≡SiH with silanols to form siloxane bonds.

Additives such as fillers and pigments are readily incorporated. Carbon black, vermiculite, mica, wollastonite, calcium carbonate, sand, glass spheres, glass beads, ground glass and waste glass are examples of fillers which can be incorporated. Fillers can serve either as reinforcement or as fillers and extenders to reduce the cost of the molded product. Glass spheres are especially useful for preparing low density composites. When used, fillers can be present in amounts up to about 80%. Stabilizers and antioxidants are useful to maintain storage stability of the formulations and thermal oxidative stability of the final product. Coupling agents such as vinyl silane and related compounds may be used to wet the glass and promote adhesion of the resin to the glass.

For instance, chopped glass fibers can be slurried in a stabilized liquid blend (prepolymer and added polysiloxane or siloxysilane) in compounding equipment having a blade stirrer(s) or screw mixer(s). It is best to deaerate such a slurry under vacuum before injecting it into a mold.

Glass or carbon, e.g., graphite, fibers are wetted very well by the liquid blends, making the blends excellent matrix materials for high strength composite structures. Thus, the prepolymer composition can be mixed with cyclic polysiloxanes, tetrahedral siloxysilanes and/or linear, short chain ≡SiH terminated polysiloxanes to form a blend, a mold containing the requisite staple or continuous filament can be charged with the blend, and the blend can be cured to form the desired composite structure. Fiber in fabric form can also be employed. Fiber reinforced composites of the polymers of this invention can contain as much as 80%, preferably 30 to 60%, by weight, of fibrous reinforcement, and, when fully cured, typically exhibit extremely high tensile and flexural properties and also excellent impact strength. Other types of fibers, e.g., metallic, ceramic and synthetic polymer fibers, also work well.

The low-viscosity fluid blends are well suited for use in reaction molding systems, where rapid mixing and flow into a mold is important. The low viscosity and affinity for glass permits filling of molds containing glass reinforcement. The high reactivity of the blends gives a fast gel time at reasonable temperatures so that molded parts can be quickly taken out of the mold and cured further outside the mold.

The thermoset polymers fabricated from the prepolymer compositions and blends described herein are useful in molded electronic parts, electrical connectors, electronic and electrical part encapsulation, and various aerospace applications. They can be molded into highly reinforced, intricate shapes and their inherent high thermal stability, low moisture absorbance and fire resistance (high char yield at 1000° C. in air) make them uniquely suitable for such uses.

The thermoset polymers are also useful as structural adhesives, curable in situ, to form strong bonds due to a high affinity of ≡SiH derived silanol groups for polar metal surfaces, especially oxidized metal surfaces. The elastomeric embodiments make excellent potting compounds for electronic applications since they can be cured in situ and have a low equilibrium water content (0.01–0.1%) after humid aging (100% relative humidity (RH), 1 week).

The glass filled, thermoset products which have been polymerized to the glassy state are characterized by high physical properties, i.e., high modulus and high tensile strength and good flex properties. They are fire resistant, burn very slowly when subjected to a flame, and self-extinguish when the flame is removed.

Thermal properties of the thermoset polymers are outstanding. The glass transition temperature (Tg) of a fully cured thermoset polymer is about 200° C. or higher. Thermal stability is excellent with usually less than 10% weight loss at 500° C. during Thermogravimetric analysis. At 1000° C. in air, they leave about 50% of a ceramic residue. This high temperature resistance makes them useful as refractory materials, fire resistant materials and ablative materials.

The thermoset polymers are also resistant to oxidation at ordinary temperatures. Above 200° C., oxidative crosslinking of silicon portions of the molecule appears to take place, resulting in the formation of a dark siliceous outer layer. This oxidized outer layer appears to impede the oxidative degradation of the bulk polymer.

The following examples are presented to demonstrate this invention. They are not intended to be limiting. Therein, all percentages, parts, etc., are by weight, unless otherwise indicated.

EXAMPLE 1

This example shows preparation of an organosilicon prepolymer useful in preparing crosslinked polymers according to this invention.

With continuous mixing, 0.031 parts bisbenzonitrile platinum dichloride, 120.4 parts (2.0 mole, 4.0 equivalents (eq)) bicycloheptadiene, and 120.4 parts (0.05 mole, 2.0 eq) methylhydrocyclosiloxanes (a mixture of tetramethylcyclotetrasiloxane, pentamethylcyclopentasiloxane, hexamethylcyclohexasiloxane, available from Huls/Petrarch, Bristol, Pa.) were added to a reaction chamber and heated gradually to 100° C. over a period of seven hours and held at 100° C. for ten hours. A yield of 298.5 parts (98%) of prepolymer was obtained.

IR analysis was conducted and the product was found not to have a peak at 2140 cm$^{-1}$ (SiH peak), indicating that the hydrosilation reaction was complete.

Proton NMR analysis showed that SiH and bicycloheptadiene double bonds had reacted and the expected Si—C bonds had formed (5.8–6.0 ppm) giving bicycloheptene substituted methylhydrocyclosiloxane as a pourable fluid prepolymer.

EXAMPLE 2

This example shows preparation of an organosilicon polymer using the organosilicon prepolymer composition of Example 1.

The bicycloheptadiene/methylhydrocyclosiloxanes prepolymer of Example 1 (5.1 parts) was stirred with hexamethyltrisiloxane (≡SiH terminated) (3.5 parts). Then, platinum catalyst (0.01 parts) was added with stirring. The mixture was deaerated under vacuum and poured into a slotted mold (3×½×⅛ inches), and cured at 120° C. for 2 hours and 150° C. for six hours. The cured polymer had a glass transition at 39° C. determined by differential scanning calorimetry. Thermogravimetric analysis was carried out in a Du Pont Thermal Analyzer (E. I. du Pont de Nemours & Company, Inc., Wilmington, Del.) at 20° C./minute, indicating a 10% loss in weight at 500° C. in air and nitrogen, demonstrating the excellent stability of the polymer at high temperatures.

EXAMPLE 3

This example shows preparation of an organosilicon polymer.

The bicycloheptadiene/methylhydrocyclosiloxanes prepolymer (5.1 parts) of Example 1 was stirred with ≡SiH terminated polydimethylsiloxane (Huls/Petrarch PS-537) (12.0 parts). Then, platinum catalyst (0.01 parts) was added with stirring. The compatible mixture was deaerated and poured into a slotted mold (3×½×⅛ inches) and cured at 120° C. for 2 hours and 150° C. for six hours. The cured polymer had a glass transition at −34° C. determined by differential scanning calorimetry. Thermogravimetric analysis indicated a 10% loss in the cured polymer at 500° C. in nitrogen and 490° C. in air, demonstrating the excellent stability of the polymer at high temperatures.

EXAMPLE 4

This example shows preparation of an organosilicon polymer from the prepolymer composition of Example 1.

The bicycloheptadiene/methylhydrocyclosiloxanes prepolymer composition of Example 1 (15.00 parts) was stirred with tetramethyldisiloxane (6.61 parts). The compatible mixture was a fluid which was degassed under aspirator vacuum and poured into a slotted mold (3×½×⅛ inches) and cured at 50° C. for 2 hours, 120° C. for 2 hours and 150° C. for 6 hours. The cured polymer had 10% weight loss at 480° C. in nitrogen and 475° C. in air, showing excellent thermal and thermal oxidative stability. The polymer was cured further at 200° C. for 2 hours and 250° C. for 2 hours. The glass transition temperature of the cured polymer was 79° C. determined by thermal mechanical analysis (Du Pont Thermomechanical Analyzer with a 100 mg load, and expansion probe at 10° C./minute). This corresponded closely with the temperature where the complex modulus (G') decreased at the glass transition (80° C.) determined by dynamic mechanical analysis. The complex modulus of the polymer was 116,000 psi at 25° C. and 87,000 psi at 75° C.

EXAMPLE 5

A catalyst comprising 0.0033 parts platinum (0.1M chloroplatinic acid in isopropanol) was added to 30.23 parts dicyclopenntadiene and heated to 55° C. for 1 hour to form a catalyst complex. Then 6 parts toluene was added to the solution.

The above solution was added gradually to a stirred mixture of 17.48 parts 1,1,3,3,5,5-hexamethyltrisiloxane (Huls/Petrarch, H7322), 18.40 parts methylhydrocyclosiloxanes (Huls/Petrarch, M8830) and 9.25 parts of toluene. The addition took 72 minutes and cooling was applied to keep the temperature of the reaction in the 49°–61° C. range. The reaction was allowed to cool and was stirred at room temperature for two days. The toluene was stripped from the prepolymer at 40° C. and 0.5 mmHg. The prepolymer was a low viscosity, clear fluid (525 centistokes at room temperature). All the norbornene double bonds of DCPD were found to be reacted by proton NMR.

The prepolymer was poured into a mold (3×½×⅛ inches) and cured at 100° C. for 1 hour and 150° C. for 4 hours. A clear polymer, which was slightly flexible and appeared to be tough resulted.

While the invention has been described with respect to specific embodiments, it should be understood that they are not intended to be limiting and that many variations and modifications are possible without departing from the scope and spirit of the invention.

I claim:

1. A crosslinked organosilicon polymer or crosslinkable organosilicon prepolymer comprising alternating (a) polycyclic polyene residues and (b) polysiloxane/siloxysilane residues linked through carbon to silicon bonds, wherein the polycyclic polyene residues are derived from polycyclic polyenes having at least two non-aromatic carbon-carbon double bonds in their rings and the polysiloxane/siloxysilane residues are derived from (i) cyclic polysiloxanes or tetrahedral siloxysilanes and (ii) linear, short chain ≡SiH terminated polysiloxanes.

2. A crosslinked organosilicon polymer or crosslinkable organosilicon prepolymer as claimed in claim 1 wherein the linear, short chain ≡SiH terminated polysiloxanes have the general formula:

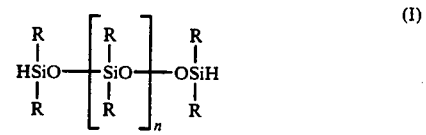

wherein n is 0 to 1000 and R is alkyl or aryl.

3. A crosslinked organosilicon polymer or crosslinkable organosilicon prepolymer as claimed in claim 2 wherein R is methyl or phenyl.

4. A crosslinked organosilicon polymer or crosslinkable organosilicon prepolymer as claimed in claim 2 wherein the total ratio of carbon-carbon double bonds in the rings of the polycyclic polyenes used to form the polycyclic polyene residues (a) to ≡SiH groups in the polysiloxanes and siloxysilanes used to form the polysiloxane/siloxysilane residues (b) is in the range of 0.4:1 to 1.7:1.

5. A crosslinked organosilicon polymer or crosslinkable organosilicon prepolymer as claimed in claim 2 wherein the total ratio of carbon-carbon double bonds in the rings of the polycyclic polyenes used to form the polycyclic polyene residues (a) to ≡SiH groups in the polysiloxanes and siloxysilanes used to form the polysiloxane/siloxysilane residues (b) is in the range of 0.8:1 to 1.3:1.

6. A crosslinked organosilicon polymer or crosslinkable organosilicon prepolymer organosilicon prepolymer composition as claimed in claim 1 wherein the polysiloxane/siloxysilane residues (b) (i) are derived from cyclic polysiloxanes having the general formula:

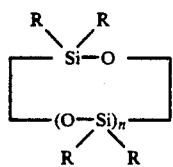
(II)

wherein R is hydrogen or a substituted or unsubstituted alkyl, alkoxy, aromatic or aryloxy radical, n is an integer from 3 to about 20, and R is hydrogen on at least two of the silicon atoms in the molecule; or tetrahedral siloxysilanes represented by the general structural formula:

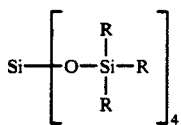
(III)

wherein R is as defined above and is hydrogen on at least two of the silicon atoms in the molecule.

7. A crosslinked organosilicon polymer or crosslinkable organosilicon prepolymer as claimed in claim 6 wherein the polysiloxane/siloxysilane residues (b) (i) are derived from polysiloxanes having the general formula (II).

8. A crosslinked organosilicon polymer or crosslinkable organosilicon prepolymer as claimed in claim 6 wherein the polysiloxane/siloxysilane residues (b) (i) are derived from polysiloxanes having the general formula (III).

9. A crosslinked organosilicon polymer or crosslinkable organosilicon prepolymer as claimed in claim 1 wherein the polycyclic polyene residues are derived from a polycyclic polyene selected from the group consisting of cyclopentadiene oligomers, diels-alder oligomers of bicycloheptadiene with cyclopentadiene, and substituted derivatives thereof.

10. A crosslinked organosilicon polymer or crosslinkable organosilicon prepolymer as claimed in claim 1 wherein the polycyclic polyene residues are derived from a polycyclic polyene selected from the group consisting of dimethanohexahydronaphthalene, dicyclopentadiene and tricyclopentadiene.

11. A crosslinked organosilicon polymer or crosslinkable organosilicon prepolymer as claimed in claim 1 wherein the polycyclic polyene residues are derived from dicyclopentadiene.

12. A crosslinked organosilicon polymer or crosslinkable organosilicon prepolymer as claimed in claim 1, wherein the 10 to 70%, by weight of the total polysiloxanes and siloxysilanes from which the polysiloxane/siloxysilane residues are derived, are linear, short chain ≡SiH terminated polysiloxanes.

13. A crosslinked organosilicon polymer as claimed in claim 1.

14. A crosslinked organosilicon polymer or crosslinkable organosilicon prepolymer as claimed in claim 2, wherein the residues of polycyclic polyenes are derived from a polycyclic polyene selected from the group consisting of cyclopentadiene oligomers, diels-alder oligomers of bicycloheptadiene with cyclopentadiene, and substituted derivatives thereof and the polysiloxane/siloxysilane residues (b) (i) are derived from cyclic polysiloxanes having the general formula:

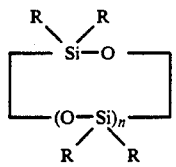
(II)

wherein R is hydrogen or a substituted or unsubstituted alkyl, alkoxy, aromatic or aryloxy radical, n is an integer from 3 to about 20, and R is hydrogen on at least two of the silicon atoms in the molecule; or tetrahedral siloxysilanes represented by the general structural formula:

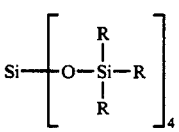
(III)

wherein R is as defined above and is hydrogen on at least two of the silicon atoms in the molecule.

15. A crosslinkable organosilicon prepolymer as claimed in claim 1 wherein about 30 to about 70% of the ≡SiH groups of the polysiloxanes and siloxysilanes used to form the polysiloxane/siloxysilane residues are reacted.

16. A crosslinked organosilicon polymer as claimed in claim 1, prepared by the process comprising:
(A) mixing an organosilicon prepolymer composition which is the reaction product of (b) (i) cyclic polysiloxanes or tetrahedral siloxysilanes containing at least two ≡SiH groups and (a) polycyclic polyenes having at least two carbon-carbon double bonds in their rings, wherein the ratio of carbon-carbon double bonds in the rings of (a) to ≡SiH groups in (b) (i) is greater than 1.8:1 and at least one of the compounds (a) and (b) (i) has more than two reactive sites with linear, short chain polysiloxanes (b) (ii) and, optionally, additional amounts of the cyclic polysiloxanes or tetrahedral siloxysilanes containing at least two ≡SiH groups (b) (i) such that the total ratio of carbon-carbon double bonds in the rings of (a) to ≡SiH groups in (b) (i) and (ii) is in the range of 0.4:1 to 1.7:1; and
(B) curing the mixture in the presence of a hydrosilation catalyst.

17. A fiber reinforced composite, comprising fiber reinforcement impregnated with the crosslinked organosilicon polymer of claim 1.

18. A fiber reinforced composite, comprising fiber reinforcement impregnated with the crosslinked organosilicon polymer of claim 2.

19. A fiber reinforced composite, comprising fiber reinforcement impregnated with the crosslinked organosilicon polymer of claim 14.

* * * * *

UNITED STATES PATENT AND TRADEMARK OFFICE
CERTIFICATE OF CORRECTION

PATENT NO. : 5,077,134
DATED : December 31, 1991
INVENTOR(S) : Raymond T. Leibfried, Sr.

It is certified that error appears in the above-identified patent and that said Letters Patent is hereby corrected as shown below:

Col. 1, between lines 42 and 49,

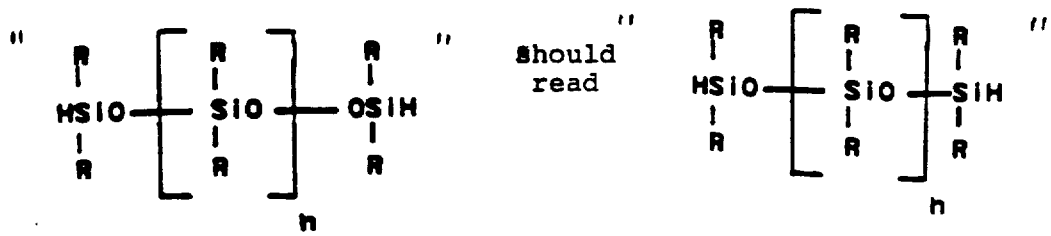

In the claims, Col. 8, between lines 42 and 48

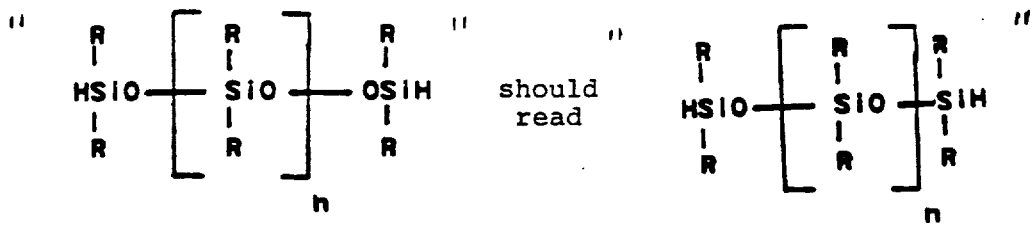

Signed and Sealed this

Twenty-second Day of June, 1993

Attest:

MICHAEL K. KIRK

*Attesting Officer*    Acting Commissioner of Patents and Trademarks